United States Patent
Shimizu et al.

(10) Patent No.: US 9,920,732 B2
(45) Date of Patent: Mar. 20, 2018

(54) ENGINE STARTING DEVICE AND ENGINE AUTOMATIC STOP AND RESTART CONTROL DEVICE

(71) Applicant: Nissan Motor Co., Ltd., Yokohama-shi, Kanagawa (JP)

(72) Inventors: Hiromoto Shimizu, Yokohama (JP); Takayuki Iwasaki, Yokohama (JP); Ryo Sano, Kawasaki (JP); Motoyuki Hattori, Atsugi (JP); Yuuichi Hosaka, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 275 days.

(21) Appl. No.: 14/370,287

(22) PCT Filed: Feb. 5, 2013

(86) PCT No.: PCT/JP2013/052614
§ 371 (c)(1),
(2) Date: Jul. 2, 2014

(87) PCT Pub. No.: WO2013/118724
PCT Pub. Date: Aug. 15, 2013

(65) Prior Publication Data
US 2014/0372013 A1    Dec. 18, 2014

(30) Foreign Application Priority Data

Feb. 9, 2012    (JP) .................................. 2012-026076

(51) Int. Cl.
*F02N 11/08*    (2006.01)
*F02N 15/00*    (2006.01)
(Continued)

(52) U.S. Cl.
CPC .......... *F02N 11/0814* (2013.01); *F02N 11/08* (2013.01); *F02N 11/087* (2013.01);
(Continued)

(58) Field of Classification Search
CPC .... F02N 11/108; F02N 11/08; F02N 11/0814; F02N 11/0818; F02N 11/0862;
(Continued)

(56) References Cited

U.S. PATENT DOCUMENTS 5,731,638 A * 3/1998 Niimi .................. F02N 11/0851
                                                        123/179.1
2004/0168664 A1* 9/2004 Senda .................... F02N 11/087
                                                        123/179.3
(Continued)

FOREIGN PATENT DOCUMENTS

CN    101832209 A       9/2010
JP    2000134707 A *    5/2000
(Continued)

*Primary Examiner* — Mahmoud Gimie
*Assistant Examiner* — John Zaleskas
(74) *Attorney, Agent, or Firm* — Global IP Counselors, LLP

(57) ABSTRACT

An engine starting device is provided with a battery, a starter motor, an inrush current limit circuit and a control unit. The inrush current limit circuit has a resistor and a bypass relay connected in parallel. The inrush current limit circuit is interposed between the battery and the starter motor. The bypass relay has a normally open contact that is configured to be closed at a time of engine startup. The control unit is programmed to include a fault identification unit that identifies a location of fault occurrence in the inrush current limit circuit based on a minimum voltage of the battery existing while the starter motor is determined to be in operation and
(Continued)

an amount of decrease in voltage of the battery existing while the normally open contact is determined to be actuated in a closing direction.

19 Claims, 5 Drawing Sheets

(51) Int. Cl.
*F02N 11/10* (2006.01)
*H02H 9/00* (2006.01)
F02N 15/06 (2006.01)

(52) U.S. Cl.
CPC ........ *F02N 11/0818* (2013.01); *F02N 11/108* (2013.01); *F02N 15/00* (2013.01); *H02H 9/002* (2013.01); *F02N 11/0862* (2013.01); *F02N 15/067* (2013.01); *F02N 2200/0807* (2013.01); *F02N 2200/101* (2013.01); *F02N 2200/102* (2013.01); *F02N 2250/02* (2013.01); *F02N 2300/2011* (2013.01); *Y02T 10/48* (2013.01)

(58) Field of Classification Search
CPC .. F02N 11/087; F02N 15/00; F02N 2200/063; F02N 2250/02; B60W 20/00; B60W 20/50; G01R 31/006; G01R 31/3278; Y02T 10/48
USPC ............... 701/29.1, 29.2, 112, 113, 114; 123/179.3, 179.4; 290/38 R
See application file for complete search history.

(56) References Cited

U.S. PATENT DOCUMENTS

| | | | | |
|---|---|---|---|---|
| 2005/0253393 A1* | 11/2005 | Senda | ................... | F02N 11/087 290/7 |
| 2007/0115604 A1* | 5/2007 | Zettel | ................. | G01R 31/3278 361/160 |
| 2009/0108674 A1* | 4/2009 | Ozaki | ................... | B60L 3/0046 307/10.6 |
| 2009/0228163 A1* | 9/2009 | Tarchinski | ............ | B60L 3/0046 701/22 |
| 2011/0128662 A1* | 6/2011 | Kato | ..................... | B60L 3/0069 361/166 |
| 2011/0196570 A1* | 8/2011 | Nakamura | .......... | F02N 11/0862 701/31.4 |
| 2011/0213525 A1* | 9/2011 | Kanemoto | .......... | F02N 11/0825 701/31.4 |
| 2011/0221210 A1* | 9/2011 | Suzuki | .................. | F02N 11/087 290/38 R |
| 2012/0032453 A1* | 2/2012 | Nakamura | ............ | F02N 11/087 290/38 R |
| 2012/0119516 A1* | 5/2012 | Connelly | ............ | F02N 11/0814 290/38 E |
| 2012/0162847 A1* | 6/2012 | Suzuki | .................. | F02N 11/087 361/206 |
| 2012/0191294 A1* | 7/2012 | Boiron | ............... | G01R 31/3278 701/33.8 |
| 2012/0200093 A1* | 8/2012 | Venkatasubramaniam ................ F02N 11/0859 290/38 R |
| 2012/0216768 A1* | 8/2012 | Nakamura | ............ | F02N 11/087 123/179.3 |
| 2012/0318227 A1* | 12/2012 | Hashimoto | ......... | F02N 11/0855 123/179.3 |
| 2013/0009648 A1* | 1/2013 | Tae | .................... | G01R 31/3278 324/503 |
| 2015/0175103 A1* | 6/2015 | Yamazaki | ............... | B60R 16/02 701/29.1 |
| 2015/0210271 A1* | 7/2015 | Yamazaki | ............... | F02N 11/04 701/22 |

FOREIGN PATENT DOCUMENTS

| | | | |
|---|---|---|---|
| JP | 2004-257369 A | | 9/2004 |
| JP | 2006081340 A | * | 3/2006 |
| JP | 2008301612 A | * | 12/2008 |
| JP | 2011014282 A | * | 1/2011 |
| JP | 2011-185260 A | | 9/2011 |
| WO | WO 2011158088 A2 | * | 12/2011 |

* cited by examiner

| | | | FAULT MODE | BYPASS RELAY STATE | VOLTAGE WAVEFORM | |
|---|---|---|---|---|---|---|
| | | | | | DURING IS RESTART | DURING INITIAL RESTART |
| NORMAL | | | | | NORMAL | B |
| DRIVING PORT IN ENGINE CONTROL UNIT | | | GND SHORT CIRCUIT | BYPASS RELAY OPEN AT RESTART | A | B |
| | | | DISCONNECTION | BYPASS RELAY NORMALLY CLOSED | B | B |
| DRIVING RELAY | EXCITATION COIL | UPSTREAM | VB SHORT CIRCUIT | – | NORMAL | B |
| | | | GND SHORT CIRCUIT | BYPASS RELAY NORMALLY CLOSED | B | B |
| | | | DISCONNECTION | BYPASS RELAY NORMALLY CLOSED | B | B |
| | | DOWNSTREAM | VB SHORT CIRCUIT | – | NORMAL | B |
| | | | GND SHORT CIRCUIT | BYPASS RELAY OPEN AT RESTART | A | B |
| | | | DISCONNECTION | BYPASS RELAY NORMALLY CLOSED | B | B |
| | CONTACT | UPSTREAM | VB SHORT CIRCUIT | – | NORMAL | B |
| | | | GND SHORT CIRCUIT | BYPASS RELAY NORMALLY CLOSED | B | B |
| | | | DISCONNECTION | BYPASS RELAY NORMALLY CLOSED | B | B |
| | | CONTACT | STUCK ON "ON" | BYPASS RELAY OPEN AT RESTART | A | B |
| | | | STUCK ON "OFF" | BYPASS RELAY NORMALLY CLOSED | B | B |
| | | DOWNSTREAM | VB SHORT CIRCUIT | BYPASS RELAY NORMALLY OPEN | A | A |
| | | | GND SHORT CIRCUIT | BYPASS RELAY NORMALLY CLOSED | B | B |
| | | | DISCONNECTION | BYPASS RELAY NORMALLY CLOSED | B | B |
| BYPASS RELAY | EXCITATION COIL | UPSTREAM | VB SHORT CIRCUIT | BYPASS RELAY NORMALLY OPEN | A | A |
| | | | GND SHORT CIRCUIT | BYPASS RELAY NORMALLY CLOSED | B | B |
| | | | DISCONNECTION | BYPASS RELAY NORMALLY CLOSED | B | B |
| | | DOWNSTREAM | VB SHORT CIRCUIT | – | NORMAL | B |
| | | | GND SHORT CIRCUIT | – | NORMAL | B |
| | | | DISCONNECTION | BYPASS RELAY NORMALLY CLOSED | B | B |
| | RESISTANCE | | DISCONNECTION | | C | B |
| | CONTACT | UPSTREAM | VB SHORT CIRCUIT | – | NORMAL | B |
| | | | GND SHORT CIRCUIT | STARTER ENERGIZATION NOT POSSIBLE | | |
| | | | DISCONNECTION | STARTER ENERGIZATION NOT POSSIBLE | | |
| | | CONTACT | STUCK ON "ON" | BYPASS RELAY NORMALLY CLOSED | B | B |
| | | | STUCK ON "OFF" | BYPASS RELAY NORMALLY OPEN | A | A |
| | | DOWNSTREAM | VB SHORT CIRCUIT | | | |
| | | | GND SHORT CIRCUIT | | | |
| | | | DISCONNECTION | | | |

FIG. 6

ENGINE STARTING DEVICE AND ENGINE AUTOMATIC STOP AND RESTART CONTROL DEVICE

CROSS-REFERENCE TO RELATED APPLICATIONS

This application is a U.S. National stage application of International Application No. PCT/JP2013/052614, filed Feb. 5, 2013, which claims priority to Japanese Patent Application No. 2012-026076 filed in Japan on Feb. 9, 2012.

BACKGROUND

Field of the Invention

The present invention relates to an engine starting device and an engine automatic stop and restart control device.

Background Information

Japanese Laid-Open Patent Application No. 2004-257369 discloses an engine starting device in which an inrush current limit circuit, comprising a resistor and a bypass relay connected in parallel, is interposed between a battery and a starter motor, and a normally open contact of the bypass relay is closed after a predetermined time has elapsed after the engine is started, whereby a decrease in the battery voltage during engine startup is suppressed.

SUMMARY

In the above engine starting device, there was demand for an ability to identify the location of fault occurrence in the inrush current limit circuit. An object of the present invention is to provide an engine starting device and an engine automatic stop and restart control device capable of identifying the location of fault occurrence in an inrush current limit circuit.

In the present invention, the location of fault occurrence in an inrush current limit circuit is identified, at engine startup, based on the minimum voltage of a battery while the starter motor is in operation and the amount of decrease in the voltage of the battery when the normally open contact of the bypass relay is actuated in the closing direction.

A disconnection occurring in a resistor, or a normally open contact of a bypass relay becoming stuck, affects the minimum voltage of the battery while the starter motor is in operation and the amount of decrease in the voltage of the battery when the normally open contact of the bypass relay is actuated in the closing direction. Therefore, looking at the minimum voltage and the amount of decrease in the voltage makes it possible to identify the location of fault occurrence in the inrush current limit circuit.

BRIEF DESCRIPTION OF THE DRAWINGS

Referring now to the attached drawings which form a part of this original disclosure:

FIG. 6 is a list of fault modes, bypass relay states, and voltage waveforms during normal operation and when a fault is present in the first embodiment.

DETAILED DESCRIPTION OF THE EMBODIMENTS

A preferred embodiment of the engine starting device and the engine automatic stop and restart control device according to the present invention will now be described with reference to the embodiments shown in the accompanying drawings.

Figure 1:
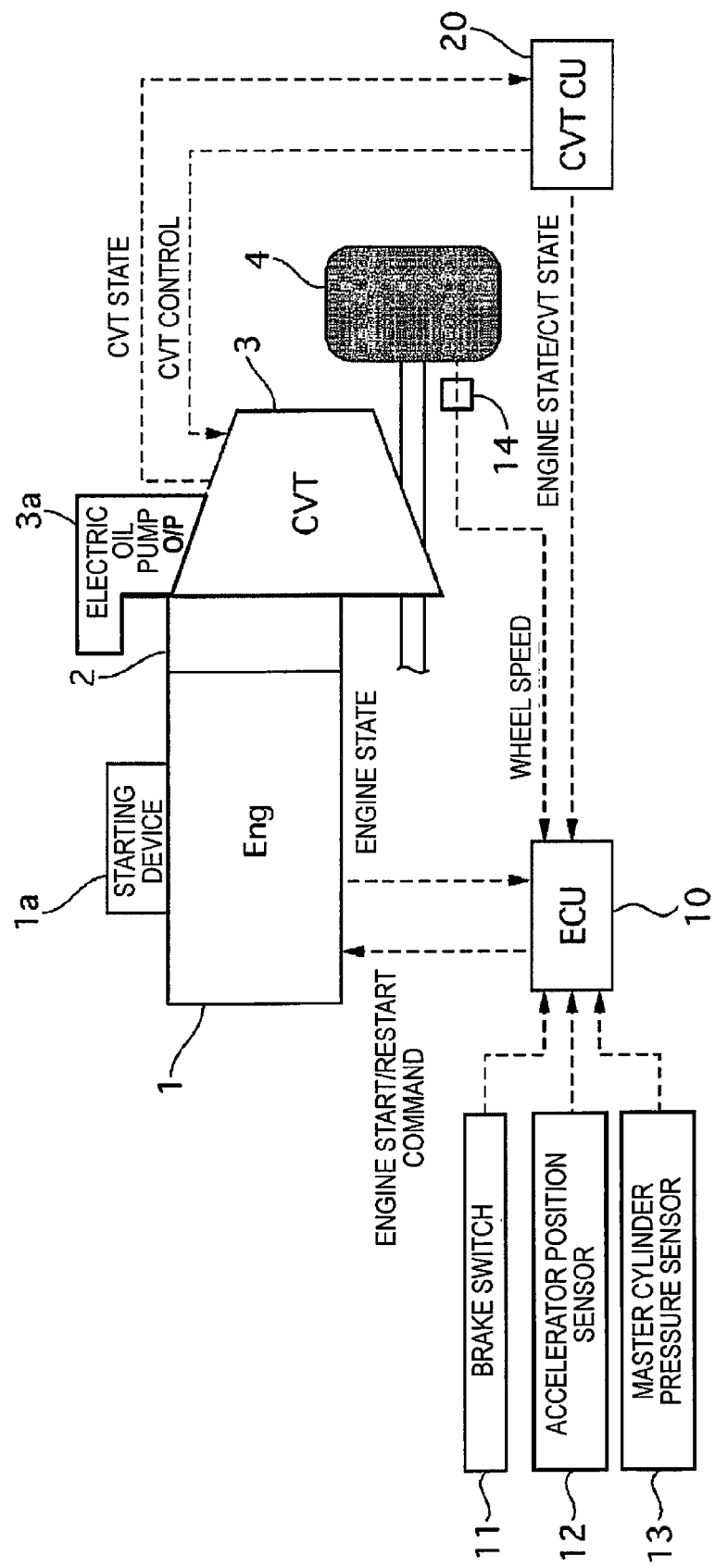
FIG. 1 is a system diagram showing a vehicle driving system according to a first embodiment.

First, the configuration of a first embodiment will be described. FIG. 1 is a system diagram showing a vehicle driving system according to the first embodiment. A rotary driving force inputted from an engine 1 is inputted through a torque converter 2 into a belt-type continuously variable transmission 3, changed in speed according to a predetermined transmission ratio, and transmitted to a driving wheel 4.

The engine 1 has a starting device 1a for performing engine startup. Specifically, the starting device 1a is provided with a starter motor, and performs engine cranking and injects fuel based on an engine startup command, and stops the starter motor once the engine 1 is able to self-rotate.

The torque converter 2 is provided to the output side of the engine 1, with the torque converter 2 having a lockup clutch which amplifies the torque at a stop-speed range and prevents relative rotation at a predetermined vehicle speed (e.g., about 14 km/h) or above. The belt-type continuously variable transmission 3 is connected to the output side of the torque converter 2. The belt-type continuously variable transmission 3 comprises a starter clutch, a primary pulley and a secondary pulley, and a belt extended across the two pulleys, and changes the pulley groove width by hydraulic control to achieve the desired transmission ratio. An oil pump driven by the engine 1 is provided in the belt-type continuously variable transmission 3. When the engine is in operation, the hydraulic pressure from the oil pump feeds the lockup clutch pressure and the converter pressure for the torque converter 2, and also feeds the clutch engagement pressure and the pulley pressure for the belt-type continuously variable transmission 3. In addition, an electric oil pump 3a is provided to the belt-type continuously variable transmission 3. When the feeding of hydraulic pressure by the oil pump is no longer possible due to automatic stopping of the engine, the electric oil pump 3a operates and feeds the necessary hydraulic pressure to each of the actuators. Accordingly, even when the engine is stopped, the desired transmission ratio can be achieved and the clutch engagement pressure can be maintained.

The operation state of the engine 1 is controlled by an engine control unit 10. A brake signal from a brake switch 11, which is caused to output an ON signal by operation of a brake pedal by the driver; an accelerator signal from an accelerator position sensor 12 for detecting the amount by which the accelerator pedal is being operated by the driver; a brake operation amount signal (master cylinder pressure) from a master cylinder pressure sensor 13 for detecting the master cylinder pressure generated based on the amount by which a brake pedal is operated; a vehicle speed signal from vehicle speed sensors 14 provided to each wheel; a CVT state signal from a CVT control unit 20 described further below; and signals representing parameters such as the engine coolant temperature, the crank angle, and the engine rotation speed, are inputted into the engine control unit 10. The engine control unit 10 starts, or automatically stops, the engine 1 based on the above signals. It is also possible to use, instead of the master cylinder pressure sensor 13, another sensor such as a depression sensor for detecting the size of the brake pedal stroke or the force by which the brake pedal is depressed or a sensor for detecting the wheel cylinder pressure, and thereby detect the amount by which the brake pedal is operated and thus detect the intention to brake on the part of the driver.

The CVT control unit 20 transmits and receives, with respect to the engine control unit 10, signals representing the engine operation state and the CVT state, and controls parameters such as the gear ratio of the belt-type continuously variable transmission 3 based on the signals. Specifically, while a travel range is selected, the CVT control unit 20 engages the starter clutch, determines the transmission ratio from a transmission ratio map based on the accelerator pedal position and the vehicle speed, and controls the pulley hydraulic pressures. When the vehicle speed is less than a predetermined vehicle speed, the CVT control unit 20 disengages the lockup clutch. When the vehicle speed is equal to or greater than the predetermined vehicle speed, the CVT control unit 20 engages the lockup clutch and puts the engine 1 and the belt-type continuously variable transmission 3 in a directly connected state. When the engine is automatically stopped while the travel range is selected, the CVT control unit 20 causes the electric oil pump 3a to operate and secures the necessary hydraulic pressure.

Engine Automatic Stop and Restart Control

Next, a description will be given for an engine automatic stop and restart control performed by the engine control unit 10. In the first embodiment, when a predetermined condition is established while the vehicle is stationary, "idling stop control", in which engine idling is stopped, is performed. In addition, if the vehicle is in motion but slowing down and it is determined that there is a high probability that the vehicle will become stationary and a transition to idling stop control will take place, coasting stop control, in which the engine 1 is stopped, is performed.

When a normal idling-stop vehicle in which coasting stop control is not performed is "coasting", where the vehicle is freewheeling without the driver operating the accelerator pedal (including a state in which the brake pedal is being operated), fuel injection is stopped, and the engine rotation speed is maintained by a coasting torque transmitted from the driving wheel 4 through the lockup clutch. However, once the vehicle has slowed to a predetermined vehicle speed, the lockup clutch is disengaged; therefore, the engine 1 will stop unless fuel injection takes place. Therefore, fuel injection is restarted at the point in time at which the lockup clutch is disengaged, and the self-rotation of the engine is maintained. Then, once it is determined that a variety of conditions, such as the vehicle becoming completely stationary and the brake pedal being sufficiently depressed, are being met, engine idling is stopped.

If, in the course of restarting fuel injection from the travel state in which fuel injection is stopped and then stopping the engine again, the fuel consumed when the fuel injection is restarted can be further suppressed, the fuel economy can be improved. Therefore, an additional feature is employed in which during coasting in an instance in which predetermined conditions are met, coasting stop control, in which restarting of fuel injection does not take place and the engine remains stopped (fuel injection is not performed), is performed, and a direct transition to normal idling stop control is made once the vehicle has become stationary.

The condition for initiating the coasting stop control (engine-stop condition) is that all of the following four conditions are satisfied, and the engine-restart condition is that one of the four conditions is not met.

1. The brake switch 11 is ON.
2. The amount by which the accelerator pedal is being operated is zero.
3. A travel range is selected.
4. The vehicle speed is equal to or less than a reference vehicle speed (vehicle speed at which the lockup clutch is disengaged).

The condition for initiating the idling stop control (engine-stop condition) is that all of the following four conditions are satisfied, and the engine-restart condition is that one of the four conditions is not met.

1. The brake switch 11 is ON.
2. The amount by which the accelerator pedal is being operated is zero.
3. A travel range is selected.
4. The state in which the vehicle speed is zero is maintained for a predetermined time.

Engine Starting Device

Figure 2:
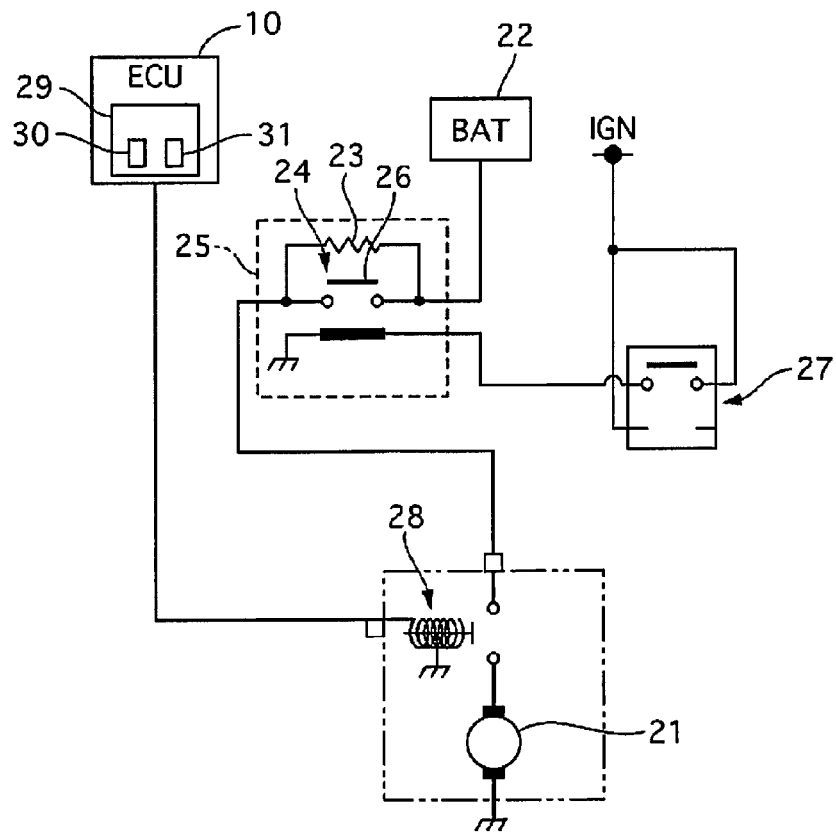
FIG. 2 is a circuit configuration diagram of an engine starting device according to the first embodiment.

FIG. 2 is a circuit configuration diagram of the engine starting device according to the first embodiment. The output shaft of the starter motor 21 is connected to the engine 1 via a belt (not shown). A battery 22 feeds a DC current to the starter motor 21. The inrush current limit circuit 25, comprising a resistor 23 and a bypass relay 24 connected in parallel, is interposed between the battery 22 and the starter motor 21. The resistor 23 keeps the current flowing into the starter motor 21 during startup of the starter motor 21 to a predetermined value or less. The bypass relay 24 has a normally open contact (contact a) 26, and is actuated (i.e., the contact is closed) by a current fed from a driving relay 27. When an ignition key switch (not shown) is set to an engine startup position ST, the driving relay 27 actuates, after a predetermined time has elapsed, the normally open contact 26 of the bypass relay 24 in a direction in which the normally open contact 26 closes. The predetermined is, e.g., the time at which the engine 1 is assumed to have exceeded the first upper dead center.

A coil relay 28, which is switched ON/OFF by the engine control unit 10, is provided at a position between the battery 22 and the starter motor 21 and further towards the starter motor 21 than the resistor 23 or the inrush current limit circuit 25. When a request to restart the engine 1 is made when the ignition key switch is set to the engine startup position ST and the idling stop control and the coasting stop control are being performed, the engine control unit 10 switches the coil relay 28 ON, feeds power from the battery 22 to the starter motor 21, and drives the starter motor 21, until the engine rotation speed reaches a set value (e.g., cranking rotation speed).

Figure 3:
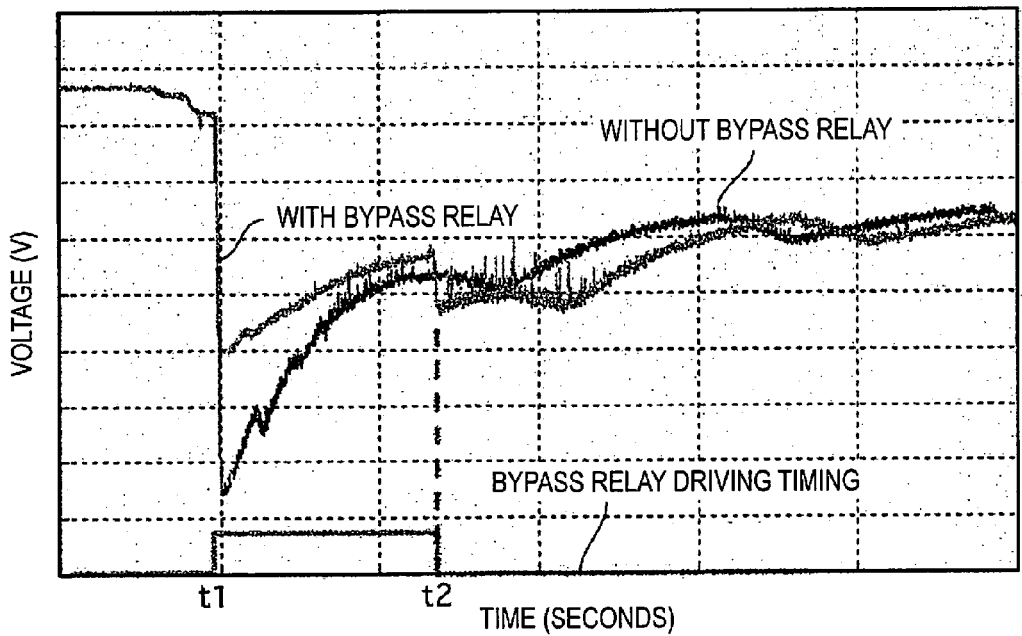
FIG. 3 is a time chart showing the inrush current limiting action performed by the inrush current limit circuit according to the first embodiment.

FIG. 3 is a time chart showing the inrush current limiting action by the inrush current limit circuit 25 according to the first embodiment. At time t1, energization of the starter motor 21 is initiated. In the above engine starting device, for a predetermined time from the initiation of starter motor 21 energization, the bypass relay 24 is OFF, and the inrush current limit circuit 25 is in an ON-state. Therefore, the startup current for the starter motor 21 is fed through the resistor 23 to the starter motor 21. It is thereby possible to suppress a decrease in the voltage of the battery 22 during startup of the starter motor 21 by a greater extent than that in an instance in which the bypass relay 24 is not present, therefore making it possible to reduce the effect on electrical equipment and similar elements mounted on the vehicle. At time t2, because a predetermined time has elapsed from initiation of starter motor 21 energization or the first upper dead center has been exceeded, the bypass relay 24 is switched from OFF to ON, whereby the inrush current limit circuit 25 is put in an OFF-state and the resistor 23 is short-circuited, a satisfactory transition can be made to a cranking state in a similar manner to conventional engine starting devices.

Bypass Relay Fault Diagnosis Process

Figure 4:
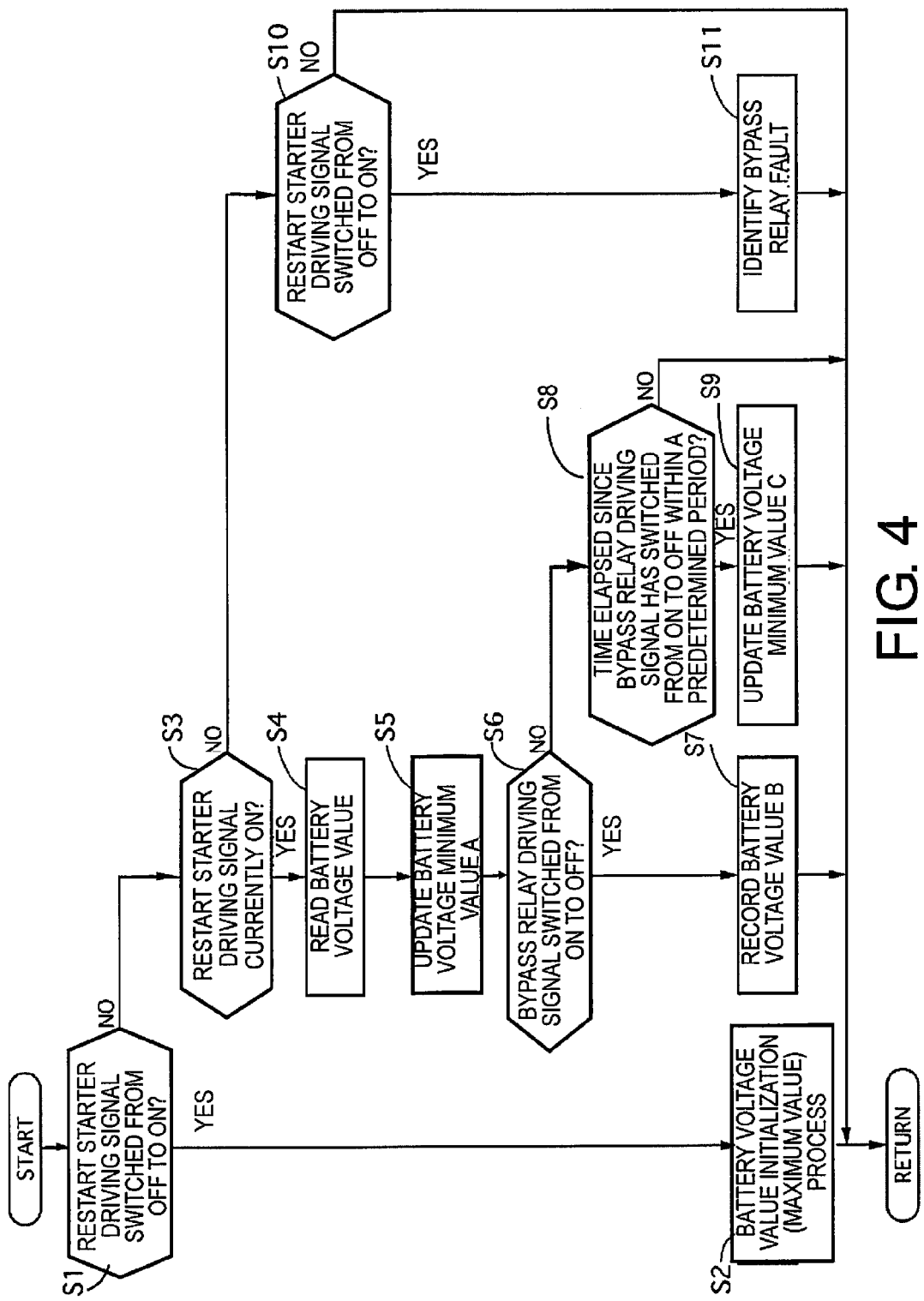
FIG. 4 is a flow chart showing the flow of a bypass relay fault diagnosis process performed by a fault identification unit according to the first embodiment.

The engine control unit 10 is provided with a fault identification unit (fault identification means) 29 for identifying the location of fault occurrence in the inrush current limit circuit 25 based on the minimum voltage of the battery 22 while the starter motor is in operation and the amount of decrease in the voltage of the battery 22 when the normally open contact 26 is actuated in the closing direction. The flow of the bypass relay fault diagnosis process performed by the fault identification unit 29 will now be described using the flow chart in FIG. 4. In step S1, it is determined whether or not the restart starter driving signal has switched from OFF to ON; if YES, the flow proceeds to step S2, and if NO, the flow proceeds to step S3. In step S2, as a battery voltage initialization process, the "battery voltage minimum value A", the "battery voltage recorded value B", and the "battery voltage minimum value C" are initialized (i.e., subjected to a maximum value process). The battery voltage minimum value A is the minimum battery voltage value detected between the restart starter driving signal switching from OFF to ON and the restart starter driving signal switching back OFF. The battery voltage recorded value B is the battery voltage value immediately after the bypass relay driving signal switches from OFF to ON. The battery voltage minimum value C is the minimum battery voltage value detected between the bypass relay driving signal switching from OFF to ON and the bypass relay driving signal switching back OFF.

In step S3, it is determined whether or not the restart starter driving signal is currently ON. If YES, the flow proceeds to step S4, and if NO, the flow proceeds to step S10. In step S4, the battery voltage value is read. In step S5, if the battery voltage value read in step S4 is lower than the stored battery voltage minimum value A, the battery voltage value is updated as the battery voltage minimum value A. In step S6, it is determined whether or not the bypass relay driving signal has switched from ON to OFF; if YES, the flow proceeds to step S7, and if NO, the flow proceeds to step S8. In step S7, the battery voltage value read in step S4 is stored as the battery voltage recorded value B. In step S8, it is determined whether or not the time elapsed since the bypass relay driving signal has switched from ON to OFF is within a predetermined period; if YES, the flow proceeds to step S9, and if NO, the flow proceeds to RETURN.

In step S9, if the battery voltage value read in step S4 is lower than the battery voltage minimum value C, the battery voltage value is updated as the battery voltage minimum value C. In step S10, it is determined whether or not the restart starter driving signal has switched from ON to OFF; if YES, the flow proceeds to step S11, and if NO, the flow proceeds to RETURN. In step S11, the bypass relay fault identification process is performed, and the location of fault occurrence is identified. In this step, it is determined whether or not the battery voltage minimum value A is equal to or less than the predetermined value A0, and whether or not the value obtained by subtracting the battery voltage minimum value C from the battery voltage recorded value B is equal to or less than a predetermined value B0, and the fault pattern is identified from a combination of the two determination results. The fault patterns and the method for identifying the fault patterns will be described further below. The predetermined value A0 is the minimum voltage of the battery 22 while the starter motor is in operation, with regards to the battery voltage waveform during normal operation. The predetermined value B0 is the amount of decrease in the voltage of the battery 22 when the normally open contact 26 is actuated in the closing direction, with regards to the battery voltage waveform during normal operation. The predetermined values A0 and B0 can be obtained experimentally or otherwise in advance. The fault identification unit 29 is provided with: an automatic stop and restart prohibition unit (automatic stop and restart prohibition means) 30 for stopping the idling stop system and the coasting stop system and alerting the driver when it is determined in the above process that a fault has occurred, and a fault information recording unit (fault information recording means) 31 for recording information representing the fault location. Once a fault has been identified, the automatic stop and restart prohibition unit 30 maintains the operation stoppage of the idling stop and coasting stop systems and the alerting of the driver until the worker has deleted the fault information from the fault information recording unit 31 after repairing the starting device.

Next, fault patterns and the method for identifying the fault patterns will now be described.

Fault Pattern A

Figure 5A:
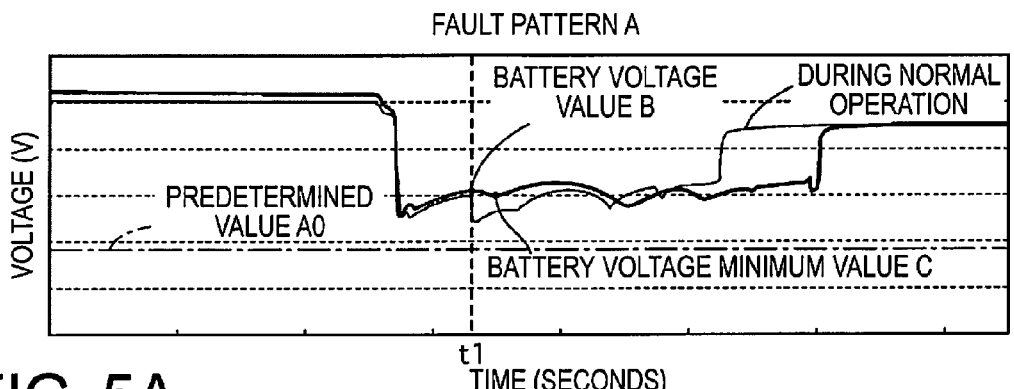
FIGS. 5A to 5C are a time charts showing the power supply voltage waveform according to each of the fault patterns in the first embodiment.

When the bypass relay 24 becomes stuck in an OFF-state (stuck in an open state), a state is reached in which a current continues to flow to the resistor 23 during engine startup. In a state in which the engine friction is larger and the starting performance of the engine 1 is poorer, e.g., during cold startup, the engine startup time increases, a large current flows through the resistor 23 for a long period of time, and there is a risk of the resistor 23 breaking by burning. The power supply voltage waveform corresponding to fault pattern A has a characteristic in that, as shown in FIG. 5A, a decrease in voltage when the inrush current limit circuit 25 is switched from OFF to ON at time t1 does not occur. Therefore, when $A > A0$ and $B - C \leq B0$ in step S11, the presence of fault pattern A can be identified.

Fault Pattern B

Figure 5B:
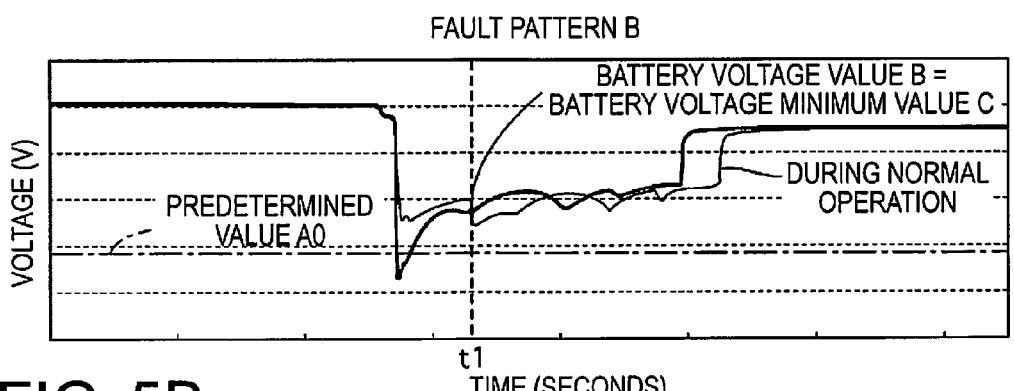

When the bypass relay 24 becomes stuck in an ON-state (stuck in a closed state), the resistor 23 ceases to function. Therefore, a decrease in battery voltage at the time of engine startup can no longer be suppressed, and the power supply to electrical equipment fails at the time of engine startup. The power supply voltage waveform corresponding to fault pattern B has a characteristic in that the voltage decrease when the starter is driven is greater than that during normal operation as shown in FIG. 5B. Therefore, when $A \leq A0$ and $B - C \leq B0$ in step S11, the presence of fault pattern B can be identified.

Fault Pattern C

Figure 5C:
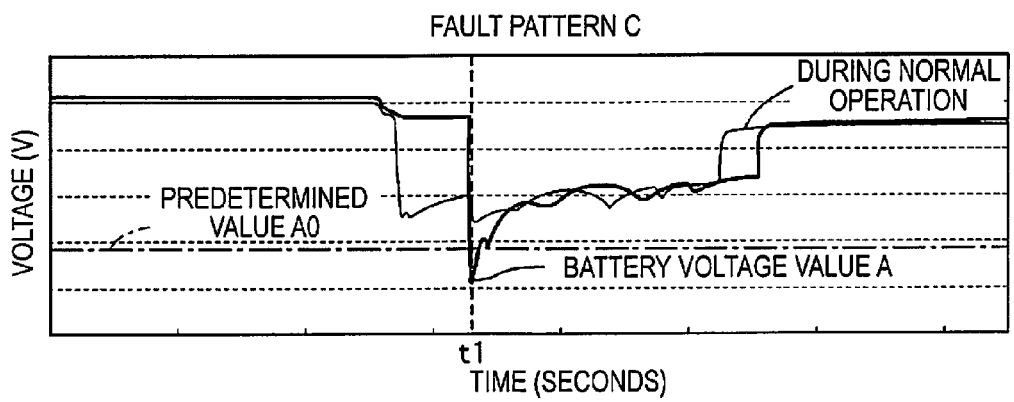

When a disconnection occurs in the resistor 23 of the bypass relay 24, the starter cannot be started until the inrush current limit circuit 25 is switched from OFF to ON, and when the inrush current limit circuit 25 is switched ON, as with the instance in which the bypass relay 24 becomes stuck in an ON-state (fault pattern B), a decrease in battery voltage cannot be suppressed, and the power supply to electrical equipment fails at the time of engine startup. The power supply voltage waveform corresponding to fault pattern C has a characteristic in that, as shown in FIG. 5C, there is no decrease in voltage until the inrush current limit circuit 25 is switched from OFF to ON, and the decrease in voltage during the switching is greater than that during normal operation. Therefore, when A≤A0 and B−C>B0 in step S11, the presence of fault pattern C can be identified. FIG. 6 is a list of fault modes, bypass relay states, and voltage waveforms during normal operation and when a fault is present.

Next, the effect of the first embodiment will be described.

(1) An engine starting device is provided in which the inrush current limit circuit 25, comprising the resistor 23 and the bypass relay 24 connected in parallel, is interposed between the battery 22 and the starter motor 21, and the normally open contact 26 of the bypass relay 24 is closed at the time of engine startup. The engine starting device is provided with a fault identification unit 29 for identifying a fault pattern based on the minimum voltage of the battery 22 while the starter motor is in operation (battery voltage minimum value A) and the amount of decrease in the voltage of the battery 22 when the normally open contact 26 is actuated in the closing direction (battery voltage recorded value B−battery voltage minimum value C). A disconnection occurring in the resistor 23, or the normally open contact 26 of the bypass relay 24 becoming stuck, affects the minimum voltage of the battery 22 while the starter motor is in operation and the amount of decrease in the voltage of the battery 22 when the normally open contact 26 of the bypass relay 24 is actuated in the closing direction. Therefore, looking at the minimum voltage and the amount of decrease in the voltage makes it possible to identify the location of fault occurrence in the inrush current limit circuit 25.

(2) The fault identification unit 29 identifies a location of fault occurrence through a comparison with a pre-recorded normal battery voltage waveform at the time of engine startup. In other words, the fault pattern is identified based on a comparison between the battery voltage minimum value A and the predetermined value A0 and a comparison between a value obtained by subtracting the battery voltage minimum value C from the battery voltage recorded value B (amount of decrease in the voltage) and the predetermined value B0, whereby it is possible to identify the location of fault occurrence without adding a diagnostic circuit or a similar element.

(3) The fault identification unit 29 identifies the bypass relay 24 as being stuck in an open state when A>A0 and B−C≤B0. When the bypass relay 24 is stuck in an open state, there is a reduction in the amount of decrease in the voltage of the battery 22 when the normally open contact 26 is actuated in the closing direction. Therefore, using this identification method makes it possible to identify, in an accurate manner, the bypass relay 24 being stuck in an open state due to a short-circuit or a disconnection in the engine control unit 10, the driving relay 27, or the bypass relay 24.

(4) The fault identification unit 29 identifies the bypass relay 24 as being stuck in a closed state when A≤A0 and B≤C≤B0. When the bypass relay 24 is stuck in a closed state, there is an increase in the amount of decrease in the voltage at the time of engine startup, and a reduction in the amount of decrease in the voltage of the battery 22 when the normally open contact 26 is actuated in the closing direction. Therefore, using this identification method makes it possible to identify, in an accurate manner, the bypass relay 24 being stuck in a closed state due to a short-circuit or a disconnection in the engine control unit 10, the driving relay 27, or the bypass relay 24.

(5) The fault identification unit 29 identifies a disconnection in the resistor 23 when A≤A0 and B−C>B0. When there is a disconnection in the resistor 23, there is an increase in the voltage effect at the time of engine startup. Therefore, using this identification method makes it possible to identify a disconnection in the resistor 23 in an accurate manner.

(6) An engine automatic stop and restart control device for automatically stopping an engine 1 when a predetermined engine-stop condition is met during coasting or when the vehicle is stationary, and restarting the engine when a predetermined engine-restart condition is subsequently met, wherein the engine automatic stop and restart control device is provided with an automatic stop and restart prohibition unit 30 for prohibiting automatic stopping and restarting of the engine 1 and alerting the driver when a location of fault occurrence is identified by the fault identification unit 29. It is thereby possible to avoid a circuit disconnection or a power supply failure in electrical equipment due to operation of the idling stop system or the coasting stop system when a fault has occurred in the engine starting device. It is also possible to urge the driver to perform a repair.

(7) A fault information recording unit 31 for recording information representing the fault location identified by the fault identification unit 29 is provided, and the automatic stop and restart prohibition unit 30 maintains the prohibition of automatic stopping and restarting of the engine 1 and the alerting of the driver until information representing the fault location is deleted after the fault location has been repaired. It is thereby possible to definitely avoid a circuit disconnection or a power supply failure in electrical equipment due to operation of the idling stop system or the coasting stop system until the fault location is definitely repaired. It is also possible to urge the driver to perform a prompt repair, until the fault location has been repaired.

Other Embodiments

Although a mode for carrying out the present invention has been described above based on an embodiment, configurations other than the present embodiment are also included in the present invention. For example, instead of performing a comparison between the amount of decrease in the voltage of the battery 22 when the normally open contact 26 is actuated in the closing direction (B−C) and the amount of decrease in the voltage during normal operation (B0), it is also possible to constantly monitor the amount of change in the voltage while the starter motor is in operation, and identify the presence of fault pattern A or fault pattern B when there is no decrease in the voltage. Also, in the embodiment, an example was given in which the battery voltage is detected directly; however, because there is a correlation between voltage and current from a battery, the fault pattern may be identified based on battery current.

The invention claimed is:

1. An engine starting device comprising:
a starter motor;
a battery;
an inrush current limit circuit comprising a resistor and a bypass relay connected in parallel, the inrush current limit circuit interposed between the battery and the starter motor, the bypass relay having a normally open contact that is configured to be closed at a time of engine startup; and
an engine control unit programmed to detect a minimum voltage of the battery existing while the starter motor is determined to be in operation and to detect an amount of decrease in voltage of the battery existing while the normally open contact is determined to be actuated in a closing direction, the voltages used by the detections being different voltages;

the engine control unit being programmed to include a fault identification unit that identifies a location of fault occurrence in the inrush current limit circuit upon the engine control unit determining the detected minimum voltage of the battery existing while the starter motor is determined to be in operation is less than a first predetermined amount and upon the engine control unit determining the detected amount of decrease in voltage of the battery existing while the normally open contact is determined to be actuated in the closing direction is less than a second predetermined amount, the engine control unit being further programmed to enable automatic stopping and restarting of an engine and to prevent the automatic stopping and restarting of the engine when the fault identification unit identifies the location of fault occurrence.

2. The engine starting device according to claim 1, wherein
the fault identification unit identifies the location of fault occurrence through a comparison with a pre-recorded normal battery voltage waveform at the time of engine startup.

3. The engine starting device according to claim 2, wherein
the fault identification unit is programmed to identify the bypass relay as being stuck in an open state when the minimum voltage of the battery is greater than a predetermined voltage and the amount of decrease in the voltage of the battery is equal to or less than a predetermined amount of decrease in the voltage.

4. The engine starting device according to claim 2, wherein
the fault identification unit is programmed to identify the bypass relay as being stuck in a closed state when the minimum voltage of the battery is equal to or less than a predetermined voltage and the amount of decrease in the voltage of the battery is equal to or less than a predetermined amount of decrease in the voltage.

5. The engine starting device according to claim 2, wherein
the fault identification unit is programmed to identify a disconnection in the resistor when the minimum voltage is equal to or less than a predetermined voltage and the amount of decrease in the voltage is greater than a predetermined amount of decrease in the voltage.

6. The engine starting device according to claim 2, wherein
the engine control unit is further programmed to include an automatic stop and restart prohibition unit for prohibiting automatic stopping and restarting of the engine and alerting a driver when the location of fault occurrence is identified by the fault identification unit.

7. The engine starting device according to claim 6, wherein
the engine control unit is further programmed to include a fault information recording unit that records information representing the fault location identified by the fault identification unit, and
the automatic stop and restart prohibition unit is programmed to maintain the prohibition of automatic stopping and restarting of the engine and to maintain the alerting of the driver until information representing the fault location is deleted after the fault location has been repaired.

8. The engine starting device according to claim 1, wherein
the fault identification unit is programmed to identify the bypass relay as being stuck in an open state when the minimum voltage of the battery is greater than a predetermined voltage and the amount of decrease in the voltage of the battery is equal to or less than a predetermined amount of decrease in the voltage.

9. The engine starting device according to claim 8, wherein
the fault identification unit is programmed to identify the bypass relay as being stuck in a closed state when the minimum voltage of the battery is equal to or less than the predetermined voltage and the amount of decrease in the voltage of the battery is equal to or less than the predetermined amount of decrease in the voltage.

10. The engine starting device according to claim 8, wherein
the fault identification unit is programmed to identify a disconnection in the resistor when the minimum voltage is equal to or less than the predetermined voltage and the amount of decrease in the voltage is greater than the predetermined amount of decrease in the voltage.

11. The engine starting device according to claim 8, wherein
the engine control unit is further programmed to include an automatic stop and restart prohibition unit for prohibiting automatic stopping and restarting of the engine and alerting a driver when the location of fault occurrence is identified by the fault identification unit.

12. The engine starting device according to claim 11, wherein
the engine control unit is further programmed to include a fault information recording unit that records information representing the fault location identified by the fault identification unit, and
the automatic stop and restart prohibition unit is programmed to maintain the prohibition of automatic stopping and restarting of the engine and to maintain the alerting of the driver until information representing the fault location is deleted after the fault location has been repaired.

13. The engine starting device according to claim 1, wherein
the fault identification unit is programmed to identify the bypass relay as being stuck in a closed state when the minimum voltage of the battery is equal to or less than a predetermined voltage and the amount of decrease in the voltage of the battery is equal to or less than a predetermined amount of decrease in the voltage.

14. The engine starting device according to claim 13, wherein
the fault identification unit is programmed to identify a disconnection in the resistor when the minimum voltage is equal to or less than the predetermined voltage and the amount of decrease in the voltage is greater than the predetermined amount of decrease in the voltage.

15. The engine starting device according to claim 13, wherein
the engine control unit is further programmed to include an automatic stop and restart prohibition unit for prohibiting automatic stopping and restarting of the engine and alerting a driver when the location of fault occurrence is identified by the fault identification unit.

16. The engine starting device according to claim 15, wherein the engine control unit is further programmed to include a fault information recording unit that records information representing the fault location identified by the fault identification unit, and the automatic stop and restart prohibition unit is programmed to maintain the prohibition of automatic stopping and restarting of the engine and to maintain the alerting of the driver until information representing the fault location is deleted after the fault location has been repaired.

17. The engine starting device according to claim 1, wherein the fault identification unit is programmed to identify a disconnection in the resistor when the minimum voltage is equal to or less than a predetermined voltage and the amount of decrease in the voltage is greater than a predetermined amount of decrease in the voltage.

18. The engine starting device according to claim 1, wherein the engine control unit is further programmed to include an automatic stop and restart prohibition unit for prohibiting automatic stopping and restarting of the engine and alerting a driver when the location of fault occurrence is identified by the fault identification unit.

19. The engine starting device according to claim 18, wherein the engine control unit is further programmed to include a fault information recording unit that records information representing the fault location identified by the fault identification unit, and the automatic stop and restart prohibition unit is programmed to maintain the prohibition of automatic stopping and restarting of the engine and to maintain the alerting of the driver until information representing the fault location is deleted after the fault location has been repaired.

* * * * *